Feb. 15, 1938.  F. B. RENTZ  2,108,320
PORTABLE SELF CONTAINED COOLING APPARATUS
Filed March 15, 1937   2 Sheets-Sheet 1
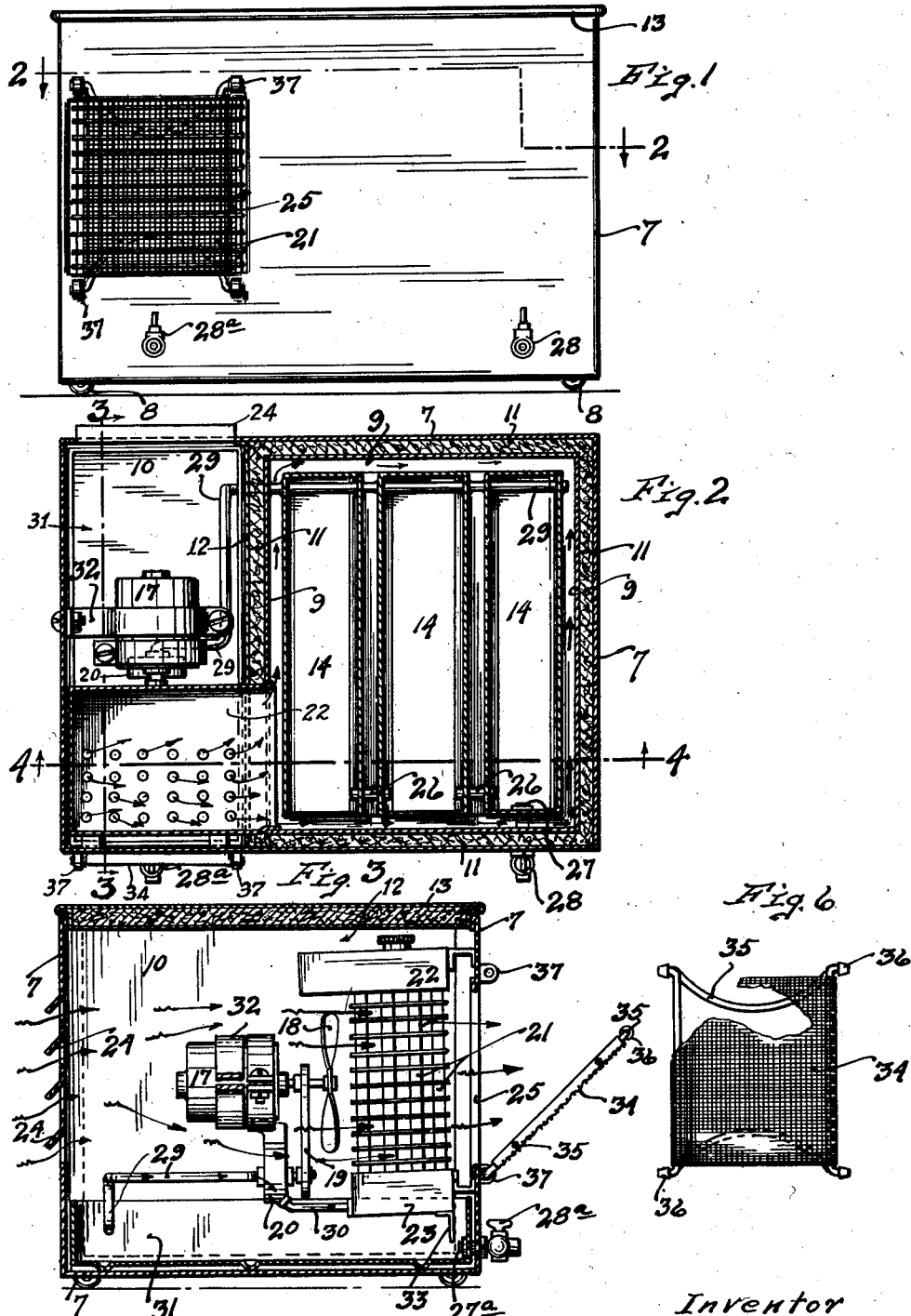
Inventor
Frank B. Rentz
By his Attorneys
Merchant & Kilgore Feb. 15, 1938.  F. B. RENTZ  2,108,320
PORTABLE SELF CONTAINED COOLING APPARATUS
Filed March 15, 1937   2 Sheets-Sheet 2
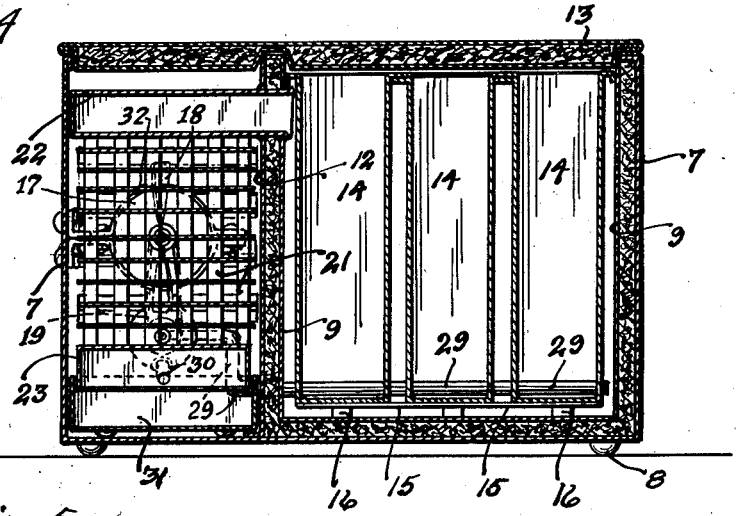
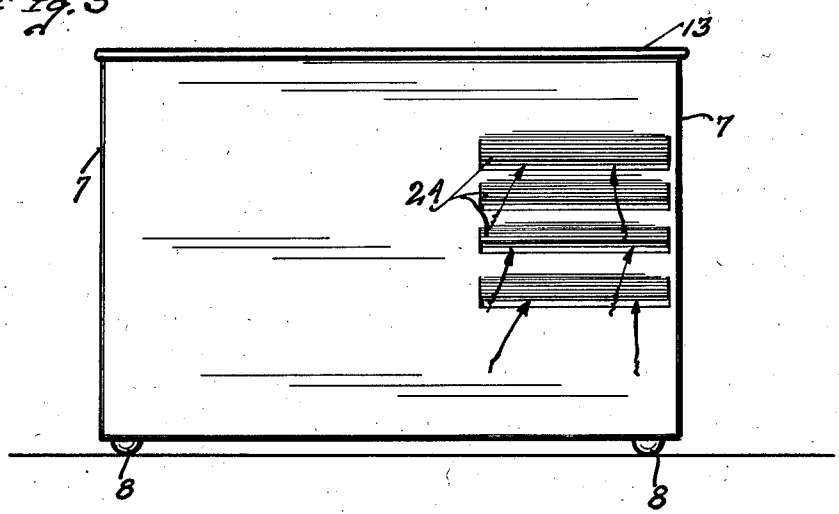
Inventor
Frank B. Rentz
By his Attorneys Patented Feb. 15, 1938

2,108,320

UNITED STATES PATENT OFFICE 2,108,320

PORTABLE SELF-CONTAINED COOLING APPARATUS

Frank B. Rentz, Wells, Minn., assignor of one-half to Willard E. Fantle, La Crosse, Wis.

Application March 15, 1937, Serial No. 130,987

4 Claims. (Cl. 62—130)

My invention provides a simple and highly efficient portable self-contained cooling apparatus especially adapted for use in homes, office buildings and the like for lowering or cooling the temperature during hot weather; and, generally stated, the invention consists of the novel devices, combinations of devices and arrangement of parts hereinafter described and defined in the claims.

The nature of the device will be made clear from a description of a preferred form or embodiment thereof illustrated in the accompanying drawings, wherein like characters indicate like parts throughout the several views.

Referring to the drawings:

Fig. 1 is a right side elevation of the apparatus;

Fig. 2 is a horizontal section taken on the irregular line 2—2 of Fig. 1, looking downward;

Fig. 3 is a vertical section taken approximately on the line 3—3 of Fig. 2, looking from the left toward the right;

Fig. 4 is a vertical section taken on the line 4—4 of Fig. 2, the fan behind the radiator being omitted to avoid confusion of lines of the latter.

Fig. 5 is a left side elevation of the apparatus; and

Fig. 6 is an elevation showing in detail a screen that is usable in connection with the apparatus.

The body or casing of the apparatus includes a rectangular outer shell 7 that is preferably mounted on rollers or anti-friction devices 8 so that it is made readily portable. Within the outer shell 7 is a rectangular inner shell 9 of less size and of horizontally less extent than the outer shell, so as to leave an air intake compartment 10. Between the walls of the shells 7 and 9 at the sides, top and bottom thereof is insulating material 11. Facing the air intake compartment 10 is a wall plate 12, between which and the adjacent wall of the inner shell is also interposed insulating material. The top of the apparatus is closed by a movable cover 13 which forms the top plate of the apparatus. This cover 13, as shown, is made of spaced walls, between which the insulating material is also placed.

Located in the inner shell 9 and spaced from each other and from the side walls and bottom thereof is a plurality of refrigerating compartments in the form of rectangular receptacles 14, preferably made of sheet metal, that are adapted to contain ice, and the tops of which are normally closed by the cover plate 13. These receptacles 14, as shown, are placed on spacing bars 15, such as metal straps, which in turn rest upon spacing blocks 16 placed on the bottom of the inner shell 9. Located within the air intake compartment is an electric motor, a fan, a pump, and a radiator. The rotor of the electric motor 17 directly carries the fan 18 and, through a belt drive 19, drives the pump 20, which latter is of an improved rotary type, such as a centrifugal pump. For example, the radiator illustrated is of a type which includes fin-equipped tubes 21 and upper and lower tanks 22 and 23, respectively. The motor driven fan 18 blows the air directly through the passages between the tubes 21 and their fins. Air is drawn into the air compartment 10 through openings or louvers 24 and is discharged from the radiator through a large opening 25.

The upper tank 22 at one side, see particularly Fig. 2, opens into the space between the inner wall of the inner shell 9 and the adjacent wall of the adjacent receptacle 14. At their lower portions the several receptacles 14 are connected by tubes 26 that permit the flow of water or other liquid from the one receptacle to the other; and one of said receptacles is provided with a drain pipe 27 equipped with a valve 28.

From the lower portion or bottom of the remote corner of the space between the inner shell 9 and the receptacles a return pipe 29 is extended to the intake of the pump 20. The discharge passage of the pump 20 is connected to the lower tank 23 by a pipe 30.

Located on the bottom of the air compartment 10 is a drip pan 31 adapted to catch water condensed on or dripping from the radiator. By reference particularly to Figs. 2 and 3 it will be noted that the casing of the pump 20 is rigidly connected to the casing or body of the motor and that the latter is supported in an elevated position from one wall of the outer shell by a bracket 32. On the bottom of the lower tank 23 is a drip flange 33 that extends within the drip pan 31. By reference to Fig. 3 it will be noted that the radiator is tilted slightly toward the left or backward so that the tops of the tanks 22 and 23 of the fins will incline in a direction to cause the dripping water to be delivered into the drip pan. Sometimes it is desirable that the air be delivered through a screen, and hence, I have provided a screen embodying a reticulate body, such as a sheet 34 which is secured at its sides to the parallel sides of a frame 35, the cross members of which are slightly bent to make them resilient, and the ends are shown as provided with tapered lugs 36 that are adapted to be inserted into the perforations of lugs 37 formed on or applied to the sides of the outer shell above and below the air discharge passage 25.

Primarily this apparatus is intended for the use of ice as a cooling medium. This ice in any suitable form, but preferably in cracked form, will be packed between the receptacles 14 and will, of course, cool and greatly reduce the temperature of the heat transferring medium, which will fill the upper and lower tanks 22 and 23, the tubes 21 and all the space around, below and between the ice receptacles 14. In most instances water will be used as this heat transferring medium. It may be sometimes desirable to accelerate the action of the cooling ice, and this may be done by commingling salt with the ice, but in that event a fluid heat transferring medium that will not freeze under the reduced temperature should, of course, be employed. The temperature of the water or heat transferring medium that has been cooled by the ice will, of course, be transmitted through the tubes or conduits of the radiator and will react upon the air that has blown through the radiator and will cool the latter. When the motor is in action, the air of the room will be drawn in through the louvers 24, forced through the radiator and out through the passage 25 so that the air will be circulated over and over again through the radiator and subjected to cooling action. Also when the motor and fan are in action, the pump 20 will draw the relatively cold water or heating medium from the space between the inner shell and receptacles and will draw the same first to the lower tank 23 and force the same upwards through the tubes to the upper tank 22, and thence back into the main cooling space.

When the screen is placed to cover the opening 25, all the air will be filtered through the screen. When, however, the screen is set obliquely, as in Fig. 3, some of the air will be forced through the screen and another part of the air will be deflected in another direction.

The heat exchange element is herein designated as a radiator and, in fact, is a radiator which, in this instance, radiates a relatively cold temperature rather than a relatively high temperature. This statement, of course, assumes that the temperature radiated from the ice receptacles 14 will be lower than the room temperature. Of course, this apparatus is intended for use only when the room temperature is higher than that desired for comfort. The chief purpose in insulating the main compartment of the apparatus is to prevent condensation of moisture on the exterior thereof.

From the foregoing it will be understood that the apparatus herein illustrated in its preferred form is capable of various modifications within the scope of the invention disclosed and claimed. The drip pan 31 can be conveniently drained through a drain pipe 27a that is equipped with a valve 28a.

In the improved cooling apparatus the receptacles 14 contain or involve means for producing relatively low temperature, that is, temperature below that of a room, for example, in hot weather. The radiator, which includes the tubes 21, is a radiator in the sense that it radiates relatively low temperature; or, stated in the reverse, absorbs heat from the air forced through the radiator elements. The radiator has certain conduits connected to chambers or passages which surround or contact with the low temperature receptacles. The casing has an air inlet and outlet for the delivery of the relatively warm air to and the cool air from the radiator, under the action of a motor-propelled fan or blower. The screen, when applied over the cooled air outlet, breaks up and spreads the air flow, thereby preventing definite air drafts.

What I claim is:

1. A portable self-contained cooling apparatus comprising an outer shell and a main compartment for a heat exchange medium, a receptacle for a cooling medium located in said main compartment, upper and lower tanks connected respectively to upper and lower parts of said main compartment, radiator tubes connecting said upper and lower tanks, a motor driven pump in the connection between said lower tank and the lower portion of said main compartment and a motor driven fan for forcing air between the said radiator tubes, and which outer shell is extended beyond said main compartment to provide an air intake chamber provided at opposite sides with air intake and discharge passages, said fan and motor being arranged in the air intake chamber of said chamber aligned with said inlet and outlet passages, and a drip pan extended along the bottom of said air chamber and below the radiator elements.

2. A portable self-contained cooling apparatus comprising an outer shell, a main compartment for heating medium located within said outer shell, a plurality of ice-containing receptacles located within said main compartment but spaced from each other and from the bottom and side walls thereof, an upper radiator tank directly connected to the upper portion of said main compartment, a lower radiator, radiator tubes connecting said upper and lower radiator tanks, said outer shell adjacent said main compartment having an air intake chamber with inlets and outlets for the circulation of air therethrough, a motor supported within said chamber, a fan driven by said motor and arranged to deliver air through said radiator tubes, a rotary pump adjacent said motor arranged to be driven from said motor, said pump having an intake pipe leading from a remote lower portion of said main chamber and a discharge pipe to said lower tank, and which outer shell is extended beyond said main compartment to provide an air intake chamber provided at opposite sides with air intake and discharge passages, said fan and motor being arranged in the air intake chamber of said chamber aligned with said inlet and outlet passages.

3. A portable self-contained cooling apparatus comprising an outer shell, a main compartment for heating medium located within said outer shell, a plurality of ice-containing receptacles located within said main compartment but spaced from each other and from the bottom and side walls thereof, an upper radiator tank directly connected to the upper portion of said main compartment, a lower radiator, radiator tubes connecting said upper and lower radiator tanks, said outer shell adjacent said main compartment having an air intake chamber with inlets and outlets for the circulation of air therethrough, a motor supported within said chamber, a fan driven by said motor and arranged to deliver air through said radiator tubes, a rotary pump adjacent said motor arranged to be driven from said motor, said pump having an intake pipe leading from a remote lower portion of said main chamber and a discharge pipe to said lower tank, and which outer shell is extended beyond said main compartment to provide an air intake chamber provided at opposite sides with air intake and discharge passages, said fan and motor being arranged in the air intake chamber of said chamber aligned with said inlet and outlet passages, and a deflecting screen movably applied to the air outlet passage of said outer shell.

4. A portable self-contained cooling apparatus comprising an outer shell, a main compartment for heating medium located within said outer shell, a plurality of ice-containing receptacles located within said main compartment but spaced from each other and from the bottom and side walls thereof, an upper radiator tank directly connected to the upper portion of said main compartment, a lower radiator, radiator tubes connecting said upper and lower radiator tanks, said outer shell adjacent said main compartment having an air intake chamber with inlets and outlets for the circulation of air therethrough, a motor supported within said chamber, a fan driven by said motor and arranged to deliver air through said radiator tubes, a rotary pump adjacent said motor arranged to be driven from said motor, said pump having an intake pipe leading from a remote lower portion of said main chamber and a discharge pipe to said lower tank, and which outer shell is extended beyond said main compartment to provide an air intake chamber provided at opposite sides with air intake and discharge passages, said fan and motor being arranged in the air intake chamber of said chamber aligned with said inlet and outlet passages, and a drip pan extended along the bottom of said air chamber and below the radiator elements.

FRANK B. RENTZ.